United States Patent [19]

Palyi

[11] 4,003,303

[45] Jan. 18, 1977

[54] APPARATUS FOR SHELLING AND CLEANING CEREALS

[75] Inventor: Leslie Palyi, Don Mills, Canada

[73] Assignee: Palyi-Hansen International Aps, Copenhagen, Denmark

[22] Filed: May 8, 1975

[21] Appl. No.: 575,503

[30] Foreign Application Priority Data

May 15, 1974 Germany .......................... 2423659

[52] U.S. Cl. .................................. 99/575; 99/606; 99/611; 99/622

[51] Int. Cl.$^2$ ...................... A23N 5/00; B02B 3/02; B07B 1/20

[58] Field of Search ............ 99/606, 608, 604, 605, 99/609, 611, 621, 622

[56] References Cited

UNITED STATES PATENTS

| | | | |
|---|---|---|---|
| 190,453 | 5/1877 | Stevens | 99/611 |
| 512,304 | 1/1894 | Lipe | 99/606 |
| 668,287 | 2/1901 | Frey | 99/622 |
| 918,226 | 4/1909 | Uhlhorn | 99/611 |
| 3,078,894 | 2/1963 | Satake | 99/610 |
| 3,603,365 | 9/1971 | Bess | 99/604 |

FOREIGN PATENTS OR APPLICATIONS

| | | | |
|---|---|---|---|
| 1,507,455 | 8/1969 | Germany | 99/605 |

*Primary Examiner*—Steven L. Stephan
*Attorney, Agent, or Firm*—Ostrolenk, Faber, Gerb & Soffen

[57] ABSTRACT

Apparatus for shelling or husking cereals comprising a horizontally oriented rotatable drum, a perforated cylinder surrounding and spaced from the annular wall of the drum, a radial chamber on the inlet side of the drum, an annular chamber between the surface of the drum and the perforated cylinder, a collection chamber for the shells or husks outside the perforated cylinder, a collection chamber at the other end of the drum for the material that has been shelled or husked and a sealable lip at the downstream end of the perforated cylinder, the seal of which is adjustable to properly control the separation of the shelled material from the shells or husks.

12 Claims, 4 Drawing Figures

APPARATUS FOR SHELLING AND CLEANING CEREALS

Figure 1:
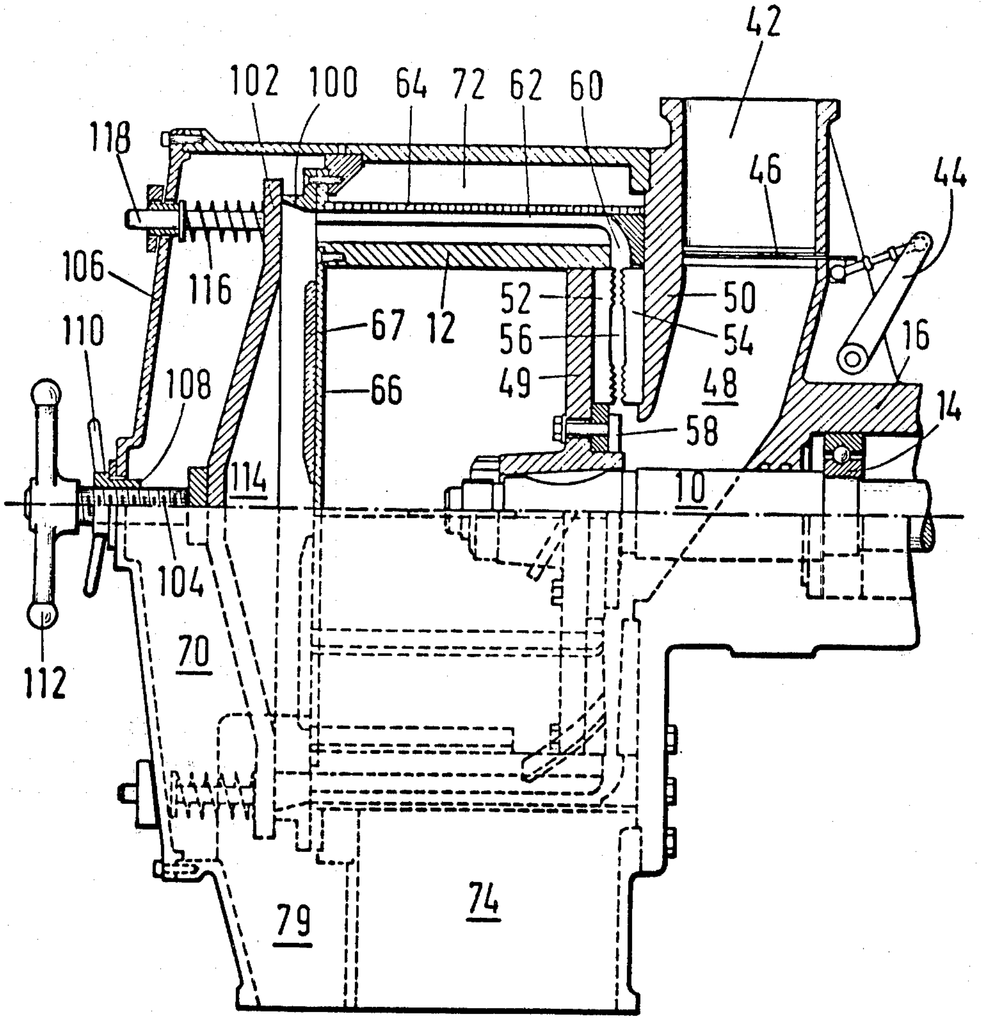

The invention relates to an apparatus for shelling or husking and cleaning cereals comprising a drum which is mounted rotatably about a horizontal axis, in axially adjustable and closed at the end faces, and the surface of which is surrounded by a perforated cylinder fixed with respect to the housing leaving an axial annular gap, and opposite the one end face of which, leaving a radial annular gap, a housing annular surface is disposed, through the central opening of which the material to be shelled flows in and passes successively through the radial and the axial annular gap, the shell particles being withdrawn via the perforated cylinder and the shelled material passing into a collection chamber at the front end face of the drum, from where it is withdrawn.

An apparatus of this type is known from DT-AS 1,938,328. In this known apparatus, on the discharge side of the drum there is a conically formed annular outlet which opens towards the collecting chamber disposed at the end face of the drum. It was often necessary to connect a plurality of stages of such apparatuses in series because complete cleaning was not always possible with one stage.

The problem underlying the invention is to construct the apparatus in such a manner that the cleaning operation is improved so that if necessary a stage of the apparatus can be dispensed with.

According to the invention this problem is solved in that the perforated cylinder is equipped at the end face with an annular lip seal against which a cover is adapted to be pressed in axially resilient manner. This provides a further adjustable annular gap through which the material at the discharge end must pass before it reaches the collecting chamber. Depending on the nature of the material to be shelled, the pressure biasing the passage gap may be varied or the plate may be held at a variable distance from the lip ends means of a threaded spindle arrangement so that a greater or lesser pressing effect in conjunction with the particular heat generation desired can be exerted on the material passing through.

As in the apparatus according to DT-AS 1,938,328 with the present invention substantially all cereals can be processed. In particular, the invention is suitable for shelling, husking, winnowing or cleaning raw barley, malt barley, oats, rice, maize, wheat, rye, hard wheat, soya beans, rape seed, sunflower seeds and sesame seed.

According to a further development of the invention the problem is solved in that the cover is adapted to be pressed under a weight load against the lip seal. Whereas in the construction according to the parent Patent the spring force was fixedly set and only the spindle force acting on the cover could be varied, according to the invention the application pressure of the cover on the lip seals is variable by simple variation of the weight load or the corresponding leverage.

The cover is suspended on the outer housing via an upper articulation and the load weight is displaceable on a rod which is preferably threaded and which projects from the sealing cover through the housing closure cover. In this manner, a very fine adjustment of the sealing gap or sealing pressure may be made to adapt it to the particular material being processed.

Figure 2:
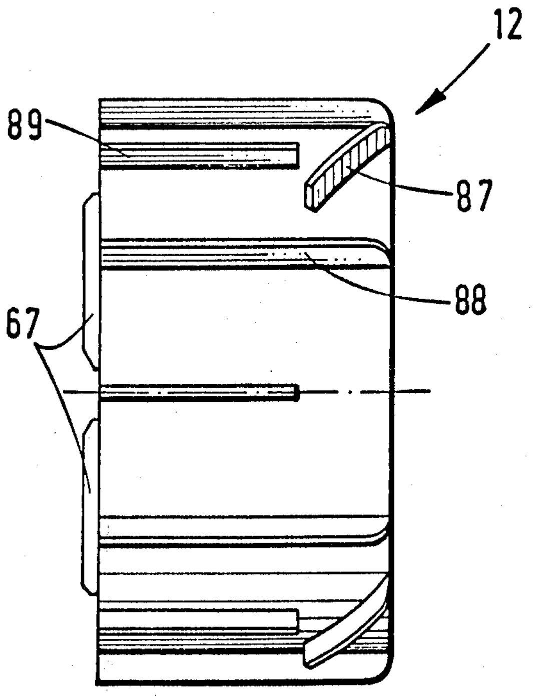
Figure 3:
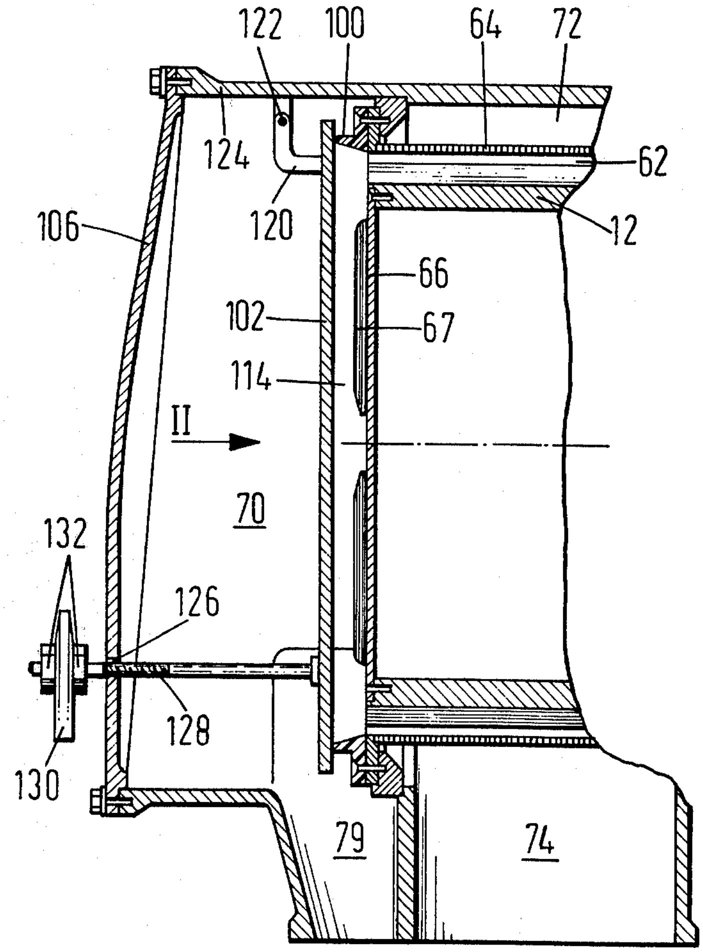
Figure 4:
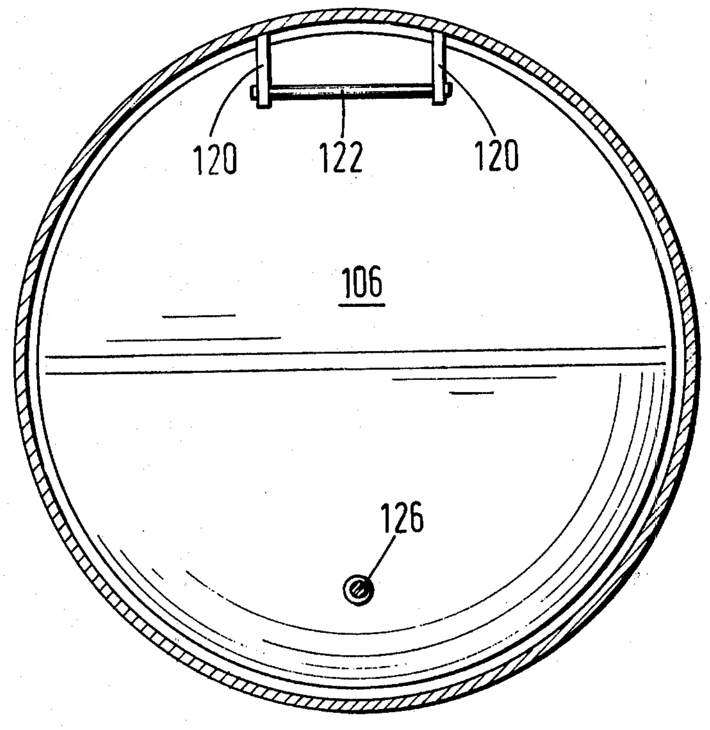

Some examples of embodiment of the invention will be explained hereinafter with the aid of the drawings, wherein:

FIG. 1 shows an axial section of a shelling apparatus according to the invention, FIG. 2 is a view of the drum, FIG. 3 shows an axial section of a discharge end of a further embodiment of a shelling apparatus according to the invention, FIG. 4 is a view in the direction of the arrow II according to FIG. 3.

The shelling apparatus comprises a drum 12 which rotates in an outer housing and is carried by a horizontal shaft 10 which is supported or mounted in cantilever manner via a bearing 14 in the housing 16 at its portion extending to the right in FIG. 1.

The axial position of the shaft and thus of the drum 12 relatively to the housing may be fixed by a clamping means which is not illustrated.

The housing comprises a filling opening 42 for the material to be shelled or cleaned in which a metering flap 46 adjustable by an actuating lever 44 is provided. The filling opening 42 leads to a central opening 48 which surrounds the shaft 10 and which is open towards the charging end face of the drum 12. The end face 49 of the drum facing the charging side is provided like the opposite housing end wall 50 with a friction lining 52 and 54 respectively. This forms a radial annular gap 56 which advantageously tapers towards the outer periphery. At the level of the central opening 48 the drum carries fan blades 58 which convey the material supplied via the filling opening 42 radially outwardly from the central opening 48. In the radially outer portion the radial annular gap 56 merges into a curved deflection gap 60 which extends into an axial annular gap 62 between the outer surface of the drum 12 and a perforated cylinder 64 fixed with respect to the housing.

The drum 12 is closed at the discharge side by a cover 66 which carries radially extending vanes 67.

The cylinder 64 is surrounded by an annular chamber 72 into which removed shell particles can pass through the perforation of the cylinder 64, these particles then being withdrawn downwardly via a hopper 74. The shelled material, on the other hand, is withdrawn through a hopper 79 which is disposed beneath a collecting chamber 70.

The outer periphery of the drum 12 is provided with impact blades 87, 88 and 89 in the form of strips which are screwed to the drum surface. The impact blades 88 extend over the entire length of the drum whereas the impact blades 89 are made shorter and cooperate with the helical or inclined strips 87, thus providing a particularly favourable conveying effect in the axial direction, expelling the shell particles.

According to the invention, at the left end of the perforated cylinder 64 as seen in FIG. 1 a resilient annular lip seal 100 is screwed on and against said seal the outer periphery of a cover 102 carried by a spindle 104 is pressed, said spindle in turn being guided by the housing cover 106. Running on the spindle 104 is a threaded sleeve 108 provided with a hand wheel 110 and a threaded sleeve provided with a hand wheel 112. Helical pressure springs 116 guided via rods 118 bear on the outer edge of the cover 102 and are supported at their other end on the housing cover 106. By adjusting the threaded sleeve 108 on the spindle 104 the passage gap between the lip 100 and the cover 102 can be adjusted because the sleeve 108 is supported in the axial direction on the housing cover 106. To fix the position set the hand wheel 112 can be screwed onto the sleeve 108 so that the two nuts act as lock nuts.

The lip seal 100 advantageously consists of resilient material and can easily be replaced when worn or when changing the machine to another type of cereal.

As in the apparatus according to DT-AS 1,938,328 friction linings of rubber may be provided at the end faces of the drum and at the outer cylinder 64 as well a friction lining may be provided at least over a portion of the periphery, thus enabling for example the perforation to be restricted to the lower portion.

Formed between the drum cover 66 and the cover 102 is an antechamber 114 into which the material passes from the axial annular gap 62 and is worked by the vanes 67. From this antechamber 114 the material further processed therein is conveyed through the annular gap between the lip seal 100 and the cover edge 102 into the collecting chamber 70 or hopper 79. The particles or dust additionally removed during this operation are withdrawn in conventional manner via an air sifter.

FIGS. 3 and 4 will now be explained:

The drum 12 mounted in cantilever manner in a bearing, not illustrated, on the right-hand side of FIG. 1 is sealed on the discharge side of a cover 66 which carries the radially extending vanes 67. Leaving an axial annular gap 62 the drum 12 is surrounded by a perforated cylinder 64 which is fixed with respect to the housing and which in turn is surrounded by an annular chamber 72 into which the removed shell particles or dust can pass through the perforation of the cylinder 64, which are then withdrawn via a hopper 74. The shelled material on the other hand is withdrawn via a hopper 79 which is disposed beneath a collecting chamber 70.

At the left end face of the perforated cylinder 64 as seen in FIG. 3 a resilient annular lip seal 100 is fitted against which the outer periphery of the cover 102 for the cylinder 64 is pressed. Said cover 102 is carried by two angular arms 120 which are suspended on the housing 124 via an hinge 122. The cover 102 is thus pivotal about the hinge 122. The housing is closed by a cover 106 which comprises a hole 126 through which the threaded rod 128 which is fixed at the cover 102 passes. Said threaded rod 128 carries a weight disc 120 which is adapted to be fixed by nuts 132 at any desired point of the threaded rod 128. By means of these adjusting nuts 132 the leverage with which the weight disc 130 acts can be adjusted and the application force of the cover 102 on the lip seal 100 thus varied.

Formed between the drum cover 66 and the cylinder cover 102 is an antechamber 114 into which the material passes from the axial annular gap 32 and is worked by the vanes 67. From this antechamber 114 the material further processed therein is conveyed through the annular gap between the lip seal 100 and the cover edge 102 into the collecting chamber 70 or hopper 79. The particles or dust additionally removed during this operation are withdrawn in conventional manner via an air sifter.

I claim:

1. Apparatus for shelling and cleaning cereals, grain, or the like comprising:

a housing; a horizontal shaft in said housing;

a drum rotatably mounted on said horizontal shaft; said drum having opposite first and second end faces which are closed and having an annular exterior;

a perforated cylinder defined around said horizontal axis and annularly surrounding and spaced from said drum to define an annular axially extending gap between said cylinder and said drum; said perforated cylinder having an exterior side outside said annular axially extending gap;

said housing having an inlet side near said first end face of said drum; an inlet to said housing at said inlet side and communicating into said annular axially extending gap;

said perforated cylinder having an end that is near said drum second end face; an annular lip seal formed on and extending beyond said end of said perforated cylinder; said lip seal being comprised of resilient material;

a cover in said housing and positioned in opposed relationship to said lip seal; means for shifting said cover away from and also toward and into varying degrees of secure engagement with said lip seal.

2. Apparatus for shelling of claim 1, further comprising:

a first collection chamber in said housing communicating with said exterior side of said perforated cylinder for collecting material passing through the perforations of said cylinder;

a second collection chamber in said housing and communicating with said lip seal at the outside of said annular axially extending gap for collecting material passing by said lip seal;

means in said housing separating said first and said second collection chambers such that material passing through said perforated cylinder will not mix with material passing said lip seal.

3. Apparatus for shelling of claim 1, wherein said housing inlet side is spaced from said drum first end face, thereby defining a radially extending gap between them; said radially extending gap connecting with said annular axially extending gap; said housing inlet communicating into said housing at said radially extending gap.

4. Apparatus for shelling of claim 1, wherein said cover and said drum second end face are respectively so shaped as to define a third chamber therebetween; said third chamber being connected with said annular axially extending gap; said third chamber being provided to receive material that passes between said drum and said cylinder and before the material passes by said lip seal into said second chamber.

5. Apparatus for shelling of claim 4, further comprising beater vanes on said drum second end face for driving material in said third chamber to move.

6. Apparatus for shelling of claim 4, further comprising impact strips projecting from said exterior of said drum for moving material through said annular axially extending gap; and shortened length conveyor strips projecting from said exterior of said drum and oriented to wrap helically around said drum and extending away from said first end face of said drum.

7. Apparatus for shelling of claim 2, wherein said housing includes an end extending past and in opposed relationship to and spaced from said cover; a spindle supported on and axially displaceable with respect to said housing end; said spindle being in engagement with said cover such that axial movement of said spindle with respect to said housing end shifts said cover with respect to said lip seal.

8. Apparatus for shelling of claim 7, wherein said spindle is threaded upon its exterior and said housing end includes a correspondingly threaded aperture through which said spindle is screwed such that rotation of said spindle axially shifts the same with respect to said housing end, thereby to shift said cover with respect to said lip seal.

9. Apparatus for shelling of claim 7, further comprising compression springs positioned at various locations around said cover and extending between said cover and said housing end for uniformly applying pressure around said cover and against said lip seal.

10. Apparatus for shelling of claim 9, wherein each of said springs is a helical spring; a respective guide rod for each said spring extending between said cover and said housing end for guiding and supporting each said spring.

11. Apparatus for shelling of claim 7, further comprising a hinge joint connected between said housing and said cover and located at the upper side of said cover; means for applying a weighted load to said cover below said hinge and oriented to urge said cover toward said lip seal.

12. Apparatus for shelling of claim 2, wherein said lip seal is removably attached to said cylinder.

* * * * *

UNITED STATES PATENT AND TRADEMARK OFFICE
CERTIFICATE OF CORRECTION

PATENT NO. : 4,003,303

DATED : January 18, 1977

INVENTOR(S) : Leslie Palyi

It is certified that error appears in the above-identified patent and that said Letters Patent are hereby corrected as shown below:

In "[30] Foreign Application Priority Data," please add March 17, 1975 Germany P 2511611.4

Column 1, line 6, change "in" to -- is -- .

Column 1, line 41, after "ends" and before "means" insert -- by --

Signed and Sealed this

*nineteenth* Day of *July 1977*

[SEAL]

*Attest:*

RUTH C. MASON
*Attesting Officer*

C. MARSHALL DANN
*Commissioner of Patents and Trademarks*